(12) United States Patent
Fossen (10) Patent No.: US 11,624,465 B2
(45) Date of Patent: Apr. 11, 2023

(54) STORZ-TYPE FLUID COUPLING AND SYSTEM

(71) Applicant: Dutchman Manufacturing Company, LLC, Traverse City, MI (US)

(72) Inventor: Tom Van Fossen, Traverse City, MI (US)

(73) Assignee: Dutchman Manufacturing Company, LLC, Traverse City, MI (US)

(*) Notice: Subject to any disclaimer, the term of this patent is extended or adjusted under 35 U.S.C. 154(b) by 125 days.

(21) Appl. No.: 17/169,152

(22) Filed: Feb. 5, 2021

(65) Prior Publication Data

US 2021/0247010 A1 Aug. 12, 2021

Related U.S. Application Data

(60) Provisional application No. 62/975,464, filed on Feb. 12, 2020.

(51) Int. Cl.
*F16L 37/252* (2006.01)
(52) U.S. Cl.
CPC .................. *F16L 37/252* (2013.01)
(58) Field of Classification Search
CPC ....... F16L 37/00; F16L 37/252; F16L 37/107; F16L 37/248; F16L 55/1155; F16L 2201/20
See application file for complete search history.

(56) References Cited

U.S. PATENT DOCUMENTS

| 489,107 | A | | 1/1893 | Storz | |
|---|---|---|---|---|---|
| 1,270,494 | A | * | 6/1918 | Christiansen | B60P 7/0823 24/375 |
| 4,402,531 | A | | 9/1983 | Kennedy, Jr. | |
| 4,523,778 | A | * | 6/1985 | Ebert | F16L 37/113 285/73 |
| 4,524,997 | A | | 6/1985 | Ebert | |

(Continued)

FOREIGN PATENT DOCUMENTS

| DE | 1152288 B | | 8/1963 |
|---|---|---|---|
| DE | 3830476 A1 | * | 3/1990 |

(Continued)

*Primary Examiner* — Zachary T Dragicevich
*Assistant Examiner* — James A Linford
(74) *Attorney, Agent, or Firm* — Reising Ethington P.C.

(57) ABSTRACT

A one-piece Storz-type fluid coupling and coupling system are disclosed that provide additional strength and a cleanout port that externally ejects debris away from the coupling. The one-piece Storz-type fluid coupling can include a flange portion including a circumferentially and radially extending base wall, an annular hub extending axially away from a radially inward portion of the base wall and having an annular axially-facing sealing surface, a pair of diametrically opposite lugs projecting axially away from the base wall, an outer wall extending circumferentially and axially outwardly from the base wall, coupling flanges extending circumferentially and radially inwardly from the outer wall and having lug retention lips, lug entry/exit pockets located between the lugs and the lug retention lips, lug retention channels located between the lug entry/exit pockets and the lugs, and cleanout ports located circumferentially between the lugs and lug retention pockets.

18 Claims, 11 Drawing Sheets

(56) References Cited

U.S. PATENT DOCUMENTS

| | | | |
|---|---|---|---|
| 4,602,654 A * | 7/1986 | Stehling | F16L 37/252 |
| | | | 285/74 |
| 4,648,630 A | 3/1987 | Bruch | |
| 5,251,940 A * | 10/1993 | DeMoss | F16L 37/252 |
| | | | 285/330 |
| 5,301,985 A | 4/1994 | Terzini | |
| 6,102,444 A | 8/2000 | Kozey | |
| 6,102,450 A | 8/2000 | Harcourt | |
| 6,447,024 B1 | 9/2002 | Lilley et al. | |
| 6,450,542 B1 | 9/2002 | McCue | |
| 6,733,045 B2 | 5/2004 | Harrignton et al. | |
| 7,128,091 B2 | 10/2006 | Istre, Jr. | |
| 7,387,320 B2 | 6/2008 | Kozey | |
| 7,543,855 B2 | 6/2009 | Ambrosi | |
| 8,683,831 B2 | 4/2014 | Trempala | |
| 9,290,916 B2 | 3/2016 | Hoogerhyde et al. | |
| 9,708,799 B2 | 7/2017 | Huelsman et al. | |
| 9,895,562 B2 | 2/2018 | Richardson | |
| 11,293,574 B2 * | 4/2022 | de Arriz | F16L 37/18 |
| 2004/0201215 A1 | 10/2004 | Steingass | |
| 2010/0205787 A1 * | 8/2010 | Remmert | D06F 95/008 |
| | | | 24/302 |

FOREIGN PATENT DOCUMENTS

| | | | | |
|---|---|---|---|---|
| DE | 29715725 U1 * | 5/1998 | | A62C 33/00 |
| DE | 29803438 U1 * | 5/1998 | | F16L 37/24 |
| DE | 20004675 U | 3/2000 | | |
| EP | 1669657 A | 6/2006 | | |
| FR | 2328915 A1 | 5/1977 | | |
| WO | WO-2015069864 A2 * | 5/2015 | | A62C 35/20 |

\* cited by examiner

STORZ-TYPE FLUID COUPLING AND SYSTEM

TECHNICAL FIELD

This patent application discloses a fluid coupling and assembly, and more particularly, a Storz-type quick twist coupling.

BACKGROUND

Fire protection and irrigation couplings can include means for quick connect and disconnect operations. One example of a quick connect and disconnect coupling can include a Storz-type coupling. The Storz-type coupling can include a hose coupling that connects using interlocking hooks and flanges. Two opposing Storz-type couplings can be pressed together so that the hooks of each coupling are inserted into the flanges of the other coupling, and the couplings can then rotate to engage the hooks with the flanges.

Conventional Storz-type couplings have limited operating pressure capacity. But some recent designs now include additional hooks (three or more) to increase operating pressure capacity. However, Storz-type couplings with three or more hooks are not backward-compatible with conventional designs.

BRIEF SUMMARY OF THE DISCLOSURE

The present disclosure embodies a number of aspects that can be implemented separately from or in combination with each other.

A one-piece Storz-type fluid coupling in accordance with one aspect of the disclosure comprises a flange portion including a circumferentially and radially extending base wall, an annular hub extending axially away from a radially inward portion of the base wall and having an annular axially-facing sealing surface, a pair of diametrically opposite lugs projecting axially away from the base wall, an outer wall extending circumferentially and axially outwardly from the base wall, coupling flanges extending circumferentially and radially inwardly from the outer wall and having lug retention lips, lug entry/exit pockets located between the lugs and the lug retention lips, lug retention channels located between the lug entry/exit pockets and the lugs, and cleanout ports located circumferentially between the lugs and lug retention pockets, where the cleanout ports partially define support walls that connect to the lug retention lips.

A Storz-type fluid coupling system in accordance with one aspect of the disclosure includes multiple one-piece Storz-type fluid couplings, each fluid coupling including a circumferentially and radially extending base wall, an annular hub extending axially away from a radially inward portion of the base wall and having an annular axially-facing sealing surface, a pair of diametrically opposite lugs projecting axially away from the base wall, an outer wall extending circumferentially and axially outwardly from the base wall, a coupling flange extending circumferentially and radially inwardly from the outer wall and having lug retention lips, lug entry/exit pockets located between the lugs and the lug retention lips, lug retention channels located between the lug entry/exit pockets and the lugs, and cleanout ports located circumferentially between the lugs and the lug entry/exit pockets; where a first fluid coupling is configured to couple to a second fluid coupling; and a seal disposed between each sealing surface.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

In accordance with at least one aspect of the disclosure, a one-piece Storz-type fluid coupling and system are provided that includes an additional supporting wall partially defined by a cleanout port and connected to a lug retention lip, thereby adding strength to the coupling and system.

A hose coupling or fluid coupling can be used, for example in firefighting applications, to connect a hose to a hydrant or other device. A fluid coupling, for example a Storz-type coupling, a ¼ turn coupling, or a sexless coupling, can be less prone to failure because of support walls that strengthen lug retention lips. To couple a conventional Storz connection, two opposing couplings can be pressed together so that the hooks of each coupling are inserted into slots in the flange of the other. The flanges can then be rotated in opposite directions, which can create a watertight connection between the couplings. One benefit of using a Storz coupling can include a speed of hose connection because, in some instances, only a quarter turn is required to engage the couplings.

Storz couplings need to absorb a large load from fluid pressure and other forces. For example, operating pressure of a hydrant can be up to 250 psi or greater. The National Fire Protection Association has established a uniform performance requirement for some hose couplings of 500 psi or greater. Some global safety certification companies have even established a hydrostatic testing requirement for Storz couplings that exceeds 1,000 psi. But some components of conventional Storz couplings, for example an inner diameter groove that the mating lug pulls against under load, may not be able to withstand these performance requirements.

Additionally, a conventional Storz coupling may include a cleaning port for certain sizes of connections. When used, the cleaning port may be internal to the Storz ring and be open to the waterway. In these instances, any debris pushed forward by the Storz lug upon connecting mating parts may be collected in this internalized area. When the mating parts are disassembled, the debris can fall into the waterway (either the hose or the coupling) from the internalized area, enter the water stream, and contaminate pump filters. Even when a cleaning port is used that is not open to the waterway, the cleaning port may still partially define a dead-end collection point where debris may reside. Sometimes when debris is built up within the conventional Storz coupling, the debris can prevent the coupling from rotating and can inhibit blind cap removal.

Consequently, the present disclosure is directed to a one-piece Storz-type fluid coupling that provides an additional supporting wall partially defined by the cleanout port and connected to a lug retention lip for added strength. The fluid coupling can bring the recess of the blind portion closer to a sealing surface so that all debris collected can be ejected externally away from the waterway.

Figure 1:
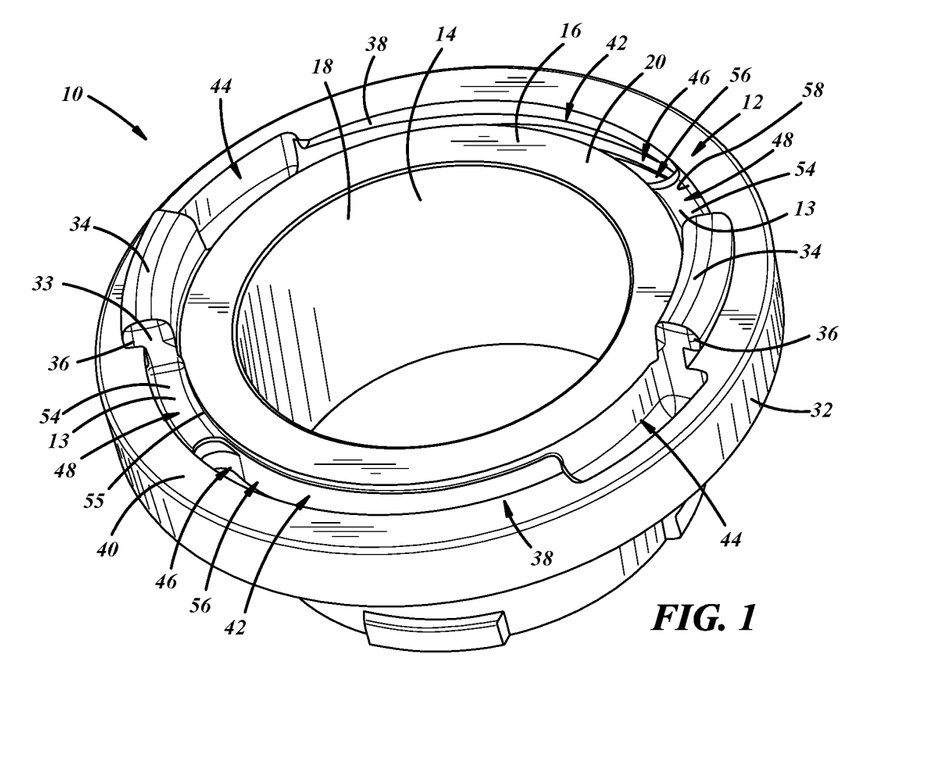
FIG. 1 is an isometric view of a one-piece Storz-type fluid coupling having a supporting wall that connects a cleanout port and a lug retention lip, in accordance with an illustrative embodiment of the present disclosure.

Referring generally to FIGS. 1 through 16, one-piece Storz-type fluid couplings 10, 110 and a Storz-type fluid coupling system 11 is shown in accordance with an illustrative embodiment of the present disclosure. Shown in FIG. 1, a one-piece Storz-type fluid coupling 10 can be configured to couple to a second Storz-type fluid coupling 110. The one-piece Storz-type fluid couplings 10, 110 can be forged and/or cast, and then machined as a single piece, and may be formed of a suitable material, for example aluminum (e.g., 6061-T6 aluminum, 2014-T6 aluminum, and the like), brass, and/or an alloy thereof.

Figure 2:
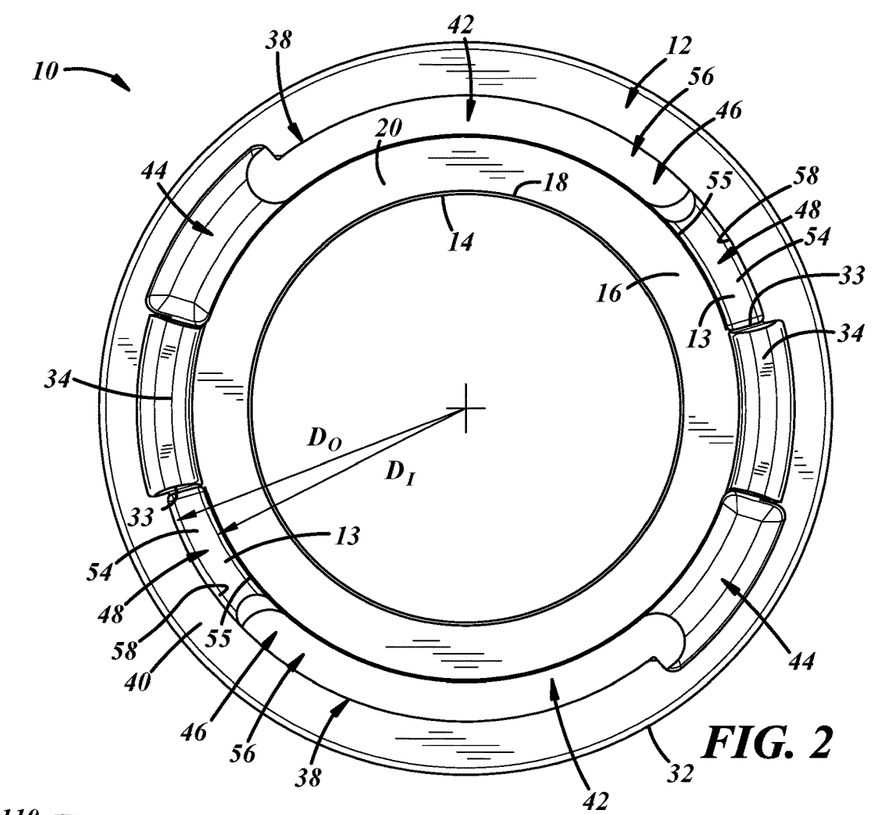
FIG. 2 is a side view of the one-piece Storz-type fluid coupling having a supporting wall that connects a cleanout port and a lug retention lip shown in FIG. 1, in accordance with an illustrative embodiment of the present disclosure.
Figure 3:
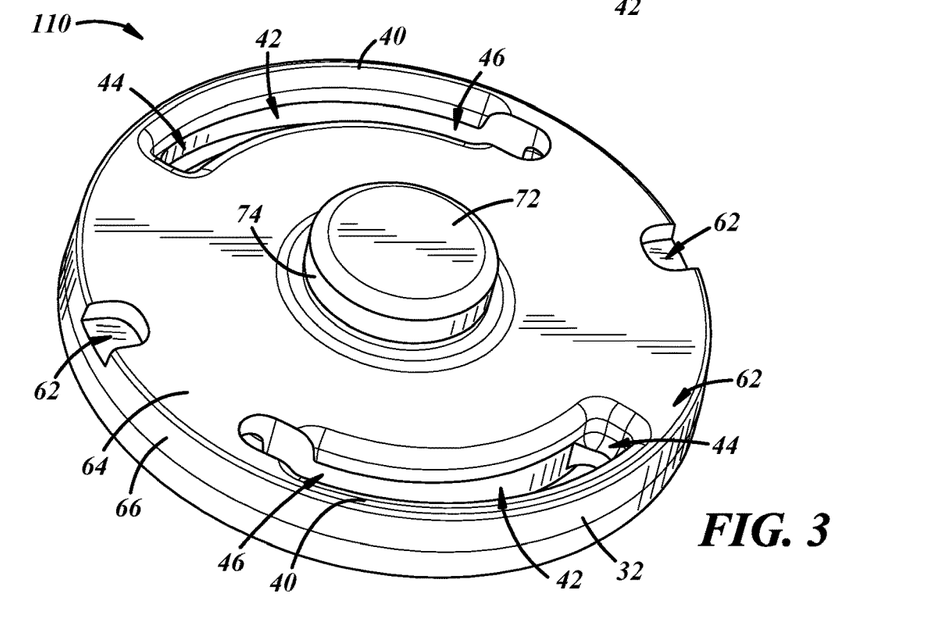
FIG. 3 is an isometric view of a one-piece Storz-type fluid coupling in the form of a blind cap, in accordance with an illustrative embodiment of the present disclosure.
Figure 4:
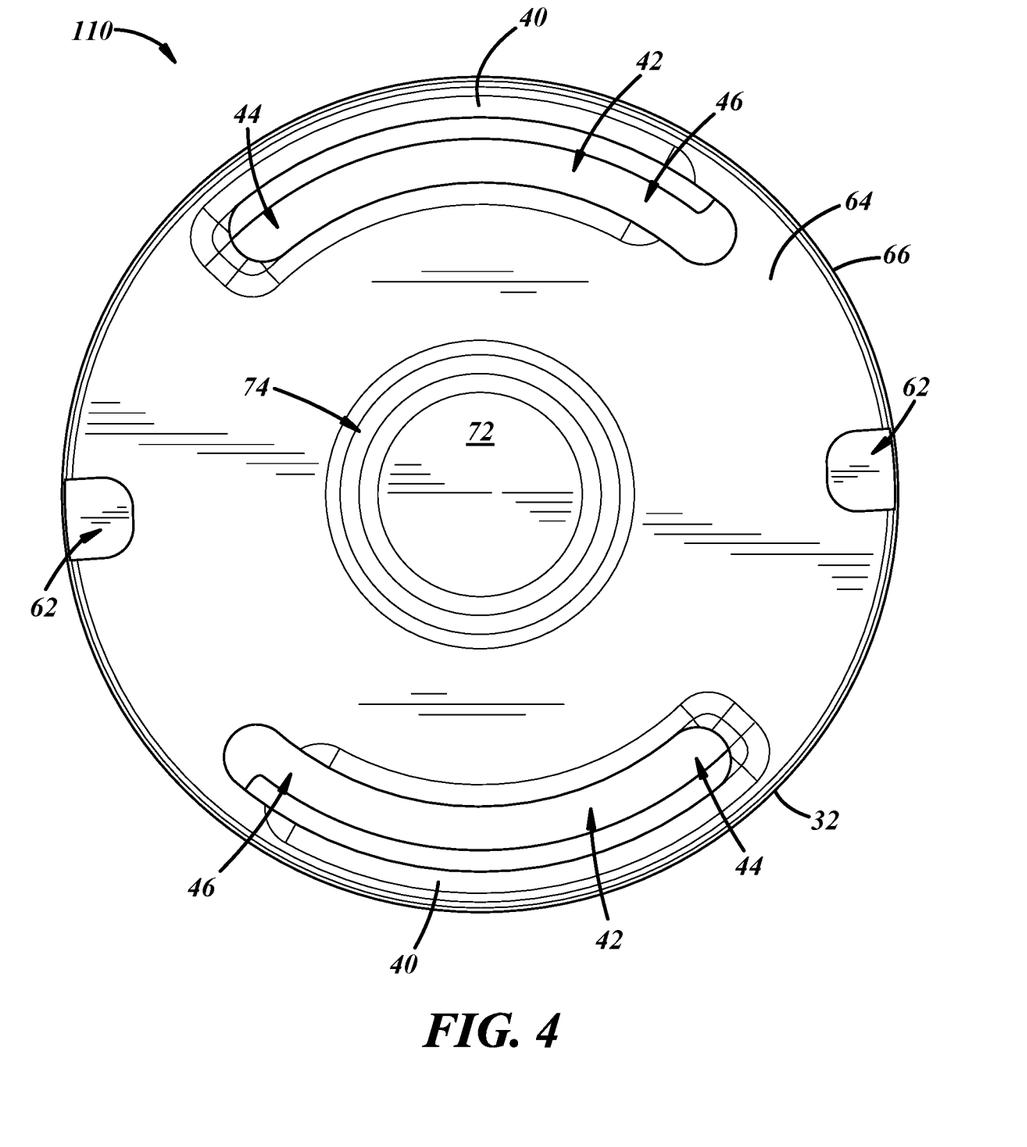
FIG. 4 is a side view of the one-piece Storz-type fluid coupling in the form of a blind cap shown in FIG. 3, in accordance with an illustrative embodiment of the present disclosure.

The fluid couplings 10, 110 can each comprise a flange portion 12, which can further include a base wall 14 and an annular hub 16 extending axially away from a radially inward portion 18 of the base wall 14 and having an annular axially-facing sealing surface 20. For example, the annular hub 16 can extend predominantly axially away from the portion 18 of the base wall 14, meaning that the even though the hub 16 extends away from the portion 18, the hub 16 may or may not include an irregularity, for example a curve. As utilized herein, the term "predominantly" can mean mainly, the majority of, and/or for the most part. The annular axially-facing sealing surface 20 can be generally planar and configured to abut a sealing surface of another fluid coupling to form a watertight seal. FIG. 2 illustrates a side view of the fluid coupling 10 shown in FIG. 1. FIGS. 3 and 4 illustrate an isometric and a side view, respectively, of a fluid coupling 10 and a fluid coupling 110 in the form of a blind cap.

Figure 5:
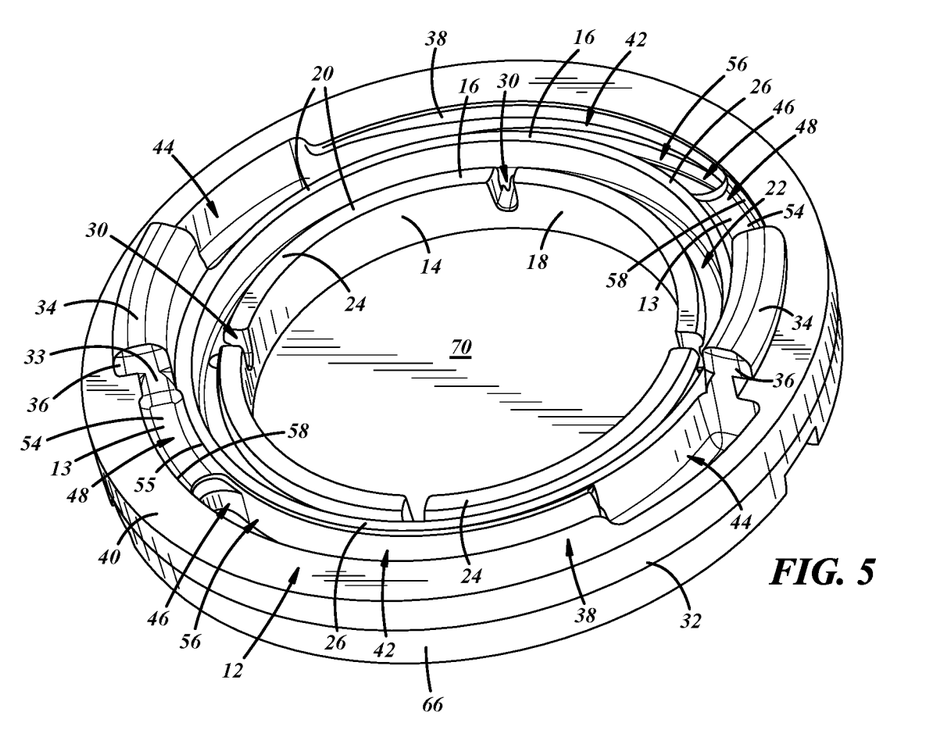
FIG. 5 is an isometric view of the one-piece Storz-type fluid coupling in the form of a blind cap shown in FIG. 3, in accordance with an illustrative embodiment of the present disclosure.
Figure 6:
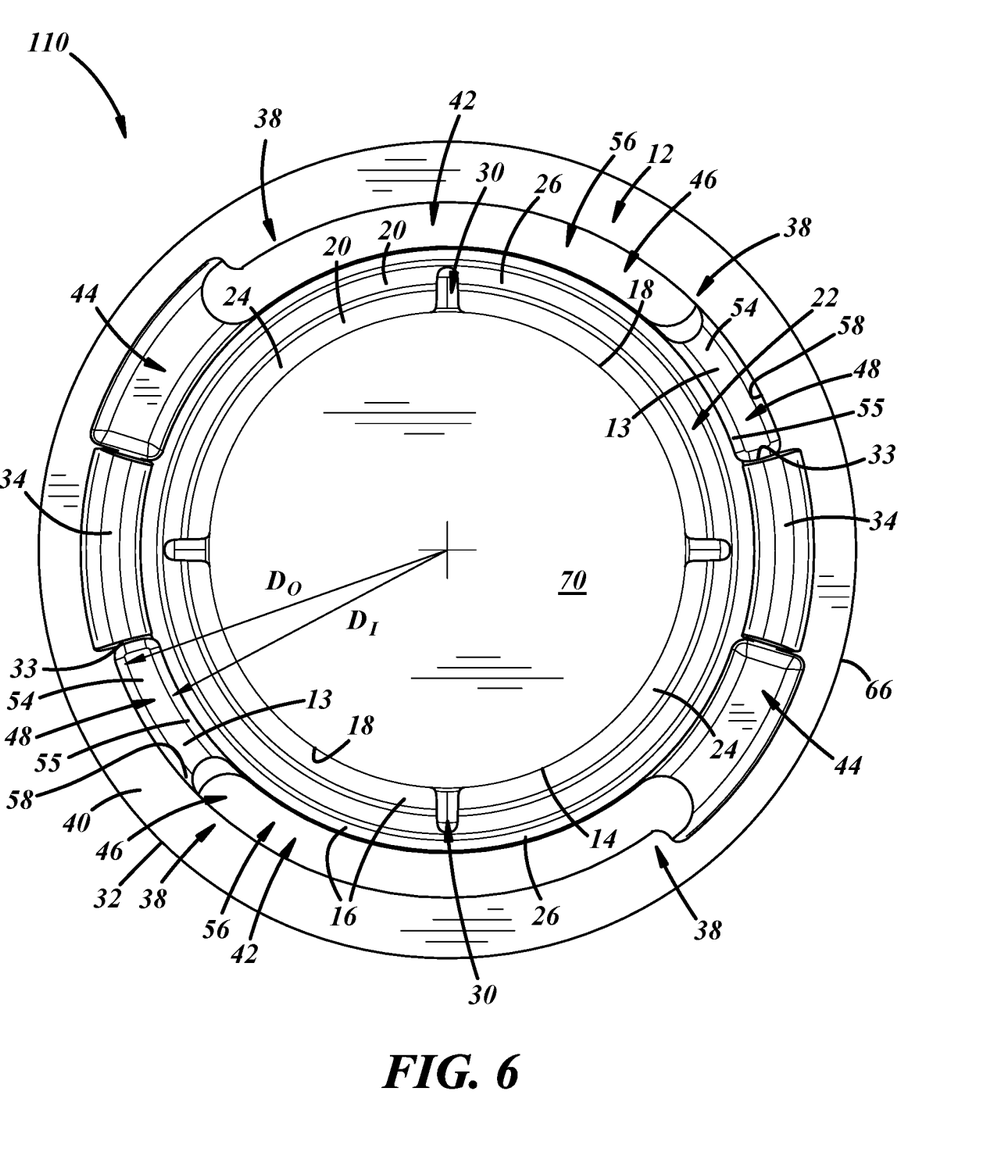
FIG. 6 is a side view of the one-piece Storz-type fluid coupling in the form of a blind cap shown in FIG. 3, in accordance with an illustrative embodiment of the present disclosure.
Figure 7:
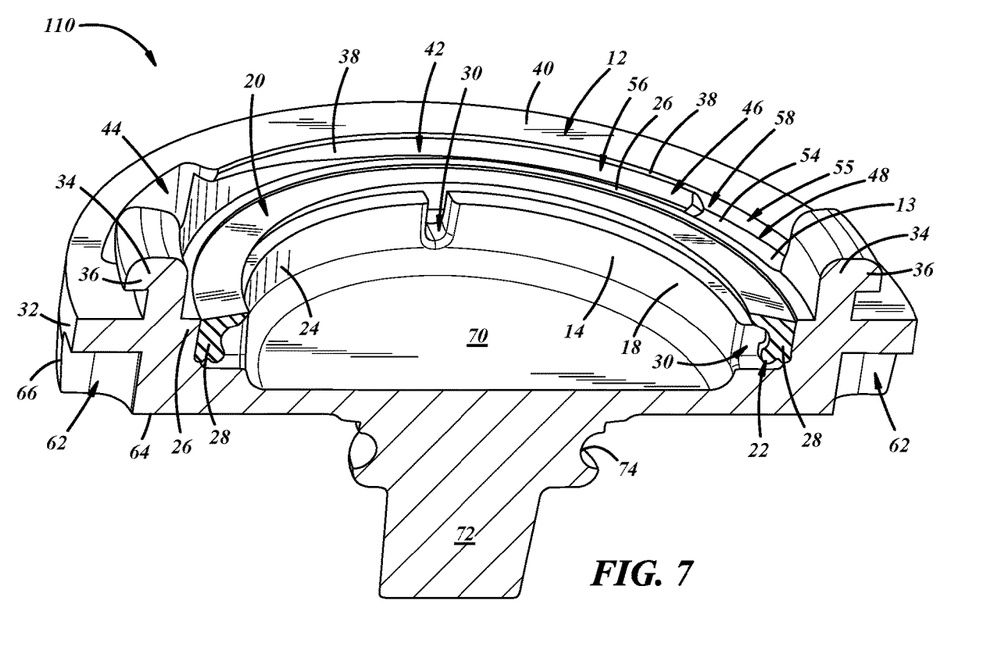
FIG. 7 is a fragmentary isometric view of the one-piece Storz-type fluid coupling in the form of a blind cap shown in FIG. 3, in accordance with an illustrative embodiment of the present disclosure.

Shown in FIGS. 5 through 7, the annular axially-facing sealing surface 20 may include a face seal groove 22, which can establish a radially inner hub wall 24 and a radially outer hub wall 26. The face seal groove 22 can be annular and can be configured to house/contain a seal 28. The seal 28 can be annular and can be disposed at least partially in the face seal groove 22. In an example, the seal 28 can include an annular rubber seal. It is contemplated that the seal 28 may be formed of other materials suitable for providing a watertight seal between multiple fluid couplings.

In some embodiments, the annular hub 16 may include at least one vent notch 30 that extends from the face seal groove 22 and through the radially inner hub wall 24 and/or the annular hub 16. The vent notches 30 can include an opening, a conduit, and/or a partial conduit that can allow a fluid to vent from and/or to the face seal groove 22. The vent notches 30 enable water to drain from behind the seal 28, which can deter ice buildup in cold climates. The vent notches 30 can also permit air to escape while installing the seal 28, which otherwise may interfere with assembly force required because trapped air can cause a buildup in pressure when assembling a mating part and can increase torque required for proper assembly. In the embodiments shown in FIGS. 5-7, the radially inner hub wall 24 includes four vent notches 30 spaced equal distances from each other. It will be appreciated that the annular hub 16 may include other numbers or configurations of vent notches 30.

The fluid couplings 10, 110 can include a pair of diametrically opposite lugs 34 that project axially away from the base wall 14 between the annular hub 16 and a coupling flange 40. For example, the lugs 34 can project predominantly away from the base wall 14. The lugs 34 can be configured to couple the fluid coupling 10 to a second fluid coupling 110. In some instances, the lugs 34 may include a hook portion 36 that can be retained by a lug retention lip 38. The hook portion 36 can radially extend outwardly from the lugs 34.

The fluid coupling 10, 110 can include an outer wall 32 extending circumferentially and axially outwardly from the base wall 14 and can include the coupling flange 40 that extends circumferentially and radially inwardly from the outer wall 32. The outer wall 32 can extend circumferentially and predominantly axially outwardly from the base wall 14, and the coupling flange 40 can extend circumferentially and predominantly radially inwardly from the outer wall 32. The coupling flange 40 can be separated from the annular hub 16 by at least one lug retention channel 42.

When the fluid coupling 10 is coupled to a second fluid coupling 110, each coupling flange 40 can be disposed against each other without any gap.

Additionally, the coupling flange 40 can include lug retention lips 38. Each lug retention lip 38 can be disposed as part of the coupling flange 40 and within the lug retention channel 42. In some instances, each lug retention lip 38 may be ramped or inclined circumferentially and/or axially.

In implementations, the lugs 34 can be inserted into and through a lug entry/exit pocket 44. When each fluid coupling 10, 110 is rotated in opposite directions from the other, each lug 34 can slide from the lug entry/exit pocket 44 and along a lug retention channel 42 to a lug retention pocket 46. Each lug retention lip 38 may be ramped so that as each lug 34 is inserted into a corresponding lug entry/exit pocket 44 of another fluid coupling 10, 110 and rotated, the lug 34 and/or the hook portion 36 can pull the fluid coupling 10, 110 against the other fluid coupling 10, 110.

The lug entry/exit pockets 44 can be located between the lugs 34 and the lug retention channel 42. A lug entry/exit pocket 44 can include an opening or recess that is large enough to allow entry or exit of a lug 34. Each lug entry/exit pocket 44 can be at least partially defined by the annular hub 16, the coupling flange 40, a lug retention channel 42, and a lug 34.

The lug retention channels 42 can be located between the lug entry/exit pockets 44 and the lugs 34. The lug retention channel 42 can allow a lug 34, after insertion into the lug entry/exit pocket 44, to pass through to a lug retention pocket 46. As the lug 34 is passing through the lug retention channel 42, the hook portion 36 of the lug 34 can be retained by the lug retention lip 38. When the lugs 34 have passed through the lug retention channels 42 to the lug retention pockets 46, the fluid couplings 10, 110 can be coupled and create a water tight seal by the fit against each seal 28 or annular hub 16 of each respective fluid coupling 10, 110.

Additionally, cleanout ports 48 can be located circumferentially between the lugs 34 and the lug retention pockets 46. The cleanout ports 48 can function to externally eject debris pushed forward by each lug 34. The cleanout ports 48 can extend circumferentially and radially from each lug 34 to each lug retention pocket 46 and each lug retention lip 38. The cleanout ports 48 can include innermost diameters Di coextensive with corresponding innermost diameters of the lug retention channels 42, and can include lug retention pockets 46 and outermost diameters Do that are coextensive with corresponding outermost diameters of the lug retention channels 42.

Each cleanout port 48 can include a blind portion 54, which may be circumferentially adjacent the lugs 34 and axially adjacent the base wall 14, and a through portion 56, which may extend through the base wall 14 and/or the lug retention channel 42. The blind portion 54 may include a recess that is at least partially defined by a circumferentially-facing wall 33 of the lug 34, a radially inwardly-facing supporting wall 58 of the coupling flange 40, a radially outwardly-facing wall 55 of the annular hub 16, and an axially-facing recessed surface 13 disposed between the annular hub 16 and the coupling flange 40. In an example of an axial depth of the recess in the blind portion 54 of a 5-inch Storz coupling, the depth may be about 3/32 inch, although it will be appreciated that other axial depths or ranges of depths may be used for a variety of coupling sizes (e.g., 1/16 inch, between 1/16 inch and 2/16 inch, between 1/32 inch and 5/32 inch, and so forth). In some instances, the recess may be tapered (e.g., planar, curved) so that the axial depth varies. In some instances, the blind portion 54 may not include a recess and may be flush with the sealing surface 20. In an example of an axial depth of the recess in the through portion 56 of a 5-inch Storz coupling, the depth may be 3/4 inch, although it will be appreciated that other axial depths or ranges of depths may be used (e.g., 7/8 inch, between 1/2 inch and 3/4 inch, between % inch and 7/8 inch, and so forth). The supporting wall 58 that partially defines the blind portion 54 can be coupled to and integrally formed with the lug retention lip 38 so that the outermost diameter Do can be constant between the lug retention lips 38 and the supporting wall 58. Because each cleanout port 48 and the supporting wall 58 extends to the lug retention lip 38, strength is added to the lug retention lip 38 as the lug 34 is pulled against the lug retention lip 38 under load.

Operating pressure of a hydrant can be 250 psi or higher in the field, although a common operating pressure may be about 65 psi. However, many conventional fluid coupling designs for hydrants are not able to withstand the high pressures and loads required by some certifications. For example, testing per NFPA 1963 requires passing a 500 psi test load (a 2× operating pressure test requirement) for a 250 psi operating pressure in order to qualify. In another example, UL testing for a 250 psi operating pressure requires passing a 1,000 psi test load (a 4× operating pressure test requirement). A UL rating for a 350 psi rated operating pressure would require passing a 1,400 psi test load. By extending the supporting wall 58 to the lug retention lip 38, instead of keeping the lug retention lip 38 isolated, more load can be absorbed before failure of the fluid coupling 10.

Additionally, conventional Storz-type fluid couplings may include a cleanout port that is internal to a Storz ring. When the cleanout port is internal to the Storz ring, any debris pushed forward by a Storz lug may be collected in the internalized cleanout port, which can further be open to the waterway. Also, the debris can often prevent the coupling from rotating. The lug 34 can push debris/material away from the lug retention lip 38 and toward an exterior of the couplings 10, 100. In some embodiments, the recess of the blind portion 54 may be tapered so that the cleanout port 48 can be sloped toward the exterior of the couplings 10, 100. Debris may also be removed by flushing the cleanout ports 48 (without opening/removing the coupling 100 in the form of a blind cap or mating coupling) with a hose using water, compressed air, or manual removal. When conventional mated fluid couplings are disassembled, existing debris can fall into the waterway (e.g., in a hose or a coupling) and contaminate pump filters. Some designs allow for some of the debris to be ejected externally away from the waterway, but a dead-end collection point can still exist. The fluid couplings 10, 110 disclosed herein can include a shallower blind portion 54 and recess and are not open to the waterway, so that the debris collected by each lug 34 can be ejected externally away from the waterway.

In some instances, the flange portion 12 can include multiple sets of diametrically opposed tool notches 62 intersecting an axially external surface 64 and a radially outer surface 66 of the flange portion 12. The sets of tool notches 62 may be diametrically opposed, and each tool notch 62 can include a recess and/or a pocket within the flange portion 12. In implementations, a hydrant wrench or other tool can be inserted into at least one tool notch 62 for rotating the fluid coupling 10. In a specific example, the flange portion 12 can include one set of two tool notches 62 diametrically opposed to each other. In another specific example, the flange portion 12 can include two sets of two tool notches 62 (a total of four notches), where each tool notch 62 in the first set is diametrically opposed to a corresponding tool notch 62 in the second set. It will be appreciated that the flange portion 12 may include other amounts and configurations of tool notches 62.

Figure 8:
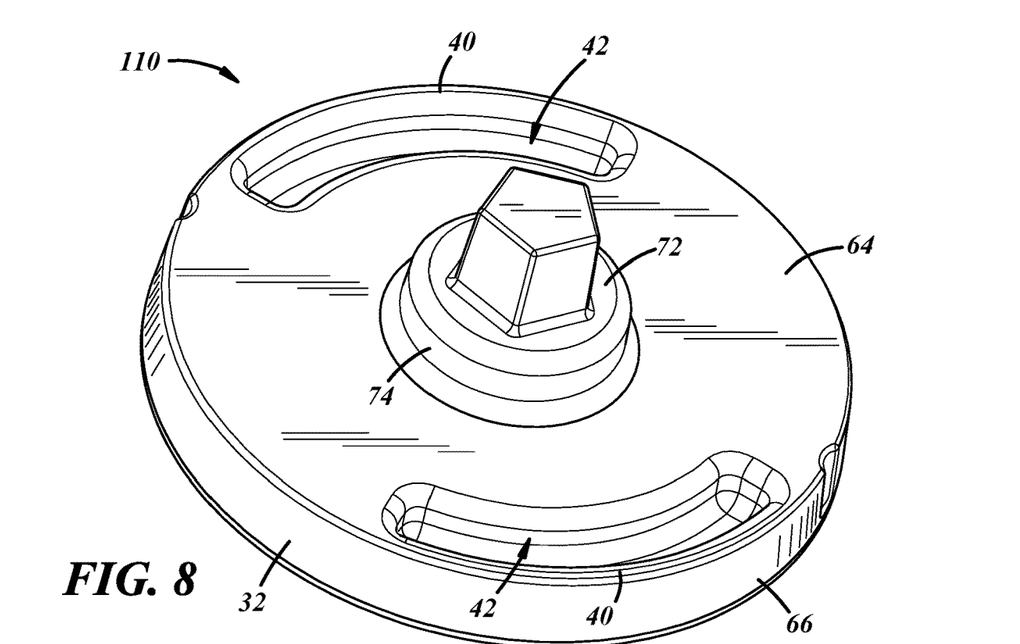
FIG. 8 is an isometric view of the one-piece Storz-type fluid coupling in the form of a blind cap shown in FIG. 3, where the external hub is five-sided, in accordance with an illustrative embodiment of the present disclosure.
Figure 9:
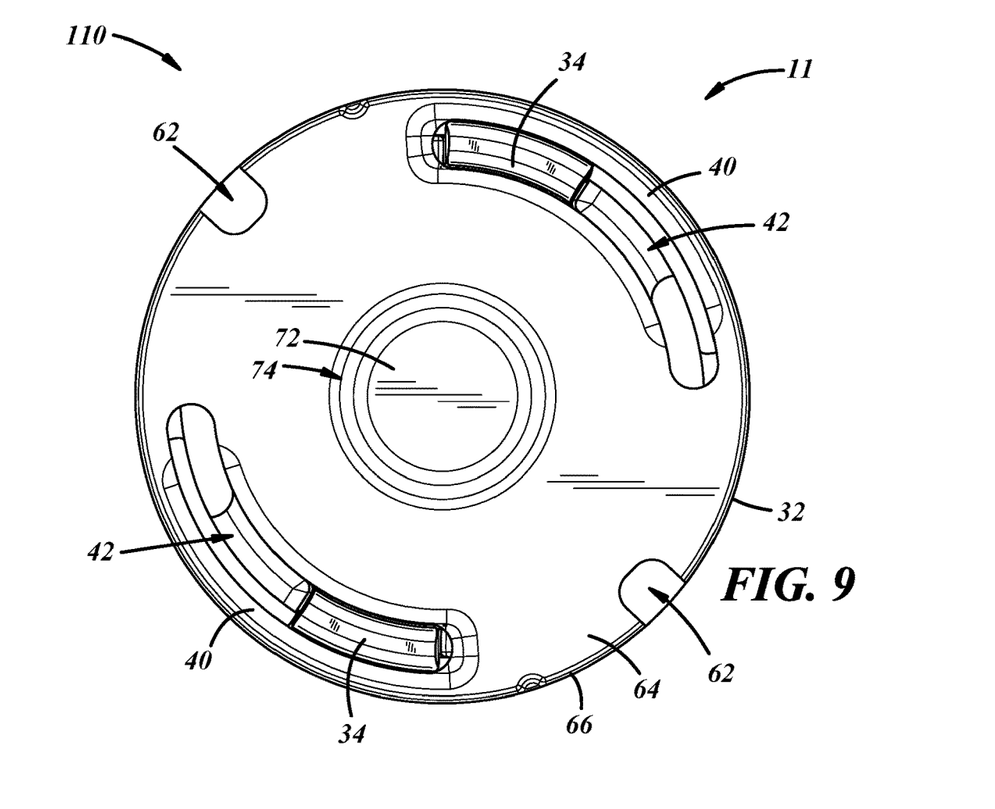
FIG. 9 is a side view of two coupled one-piece Storz-type fluid couplings, in accordance with an illustrative embodiment of the present disclosure.

FIGS. 8 and 9 illustrate isometric and side views, respectively, of an assembly 68 may comprise a fluid coupling 110 further including an inner cover wall 70 extending from the base wall 14 and having an external hub 72 with a groove 74. In implementations, the assembly 68 can serve as a blind cap or a dust cap. A blind cap can be used to cap a water or fire hydrant, for example. The external hub 72 can include multiple configurations, for example a cylindrical external hub 72 with the groove 74 disposed between the external hub 72 and the inner cover wall 70. In another configuration, the external hub 72 may include a pentagonal-shaped hub, where a wrench can be placed on the external hub 72 and rotated. When the assembly 68 is coupled to another fluid coupling 10, the inner cover wall 70 can serve to keep debris out of the waterway of the coupling.

The assembly 68 may include a double-looped cable seal coupling 76 that is connectable to the external hub 72 and/or the groove 74. The double-looped cable seal coupling 76 may include a cable seal pull tight assembly with multiple bolt seal terminations.

Figure 10:
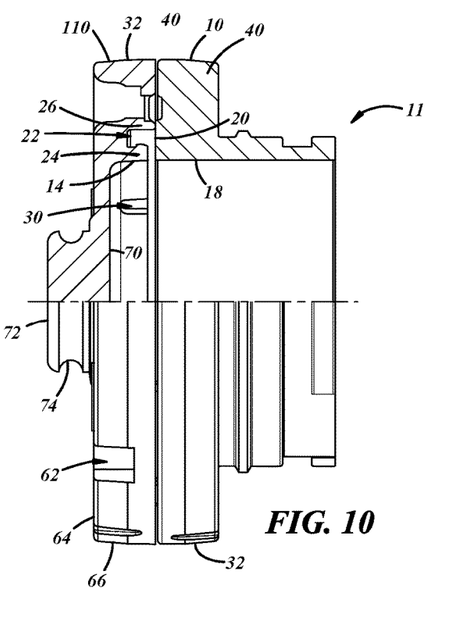
FIG. 10 is a fragmentary cross section view of the two coupled one-piece Storz-type fluid couplings along section A-A shown in FIG. 9, in accordance with an illustrative embodiment of the present disclosure.
Figure 11:
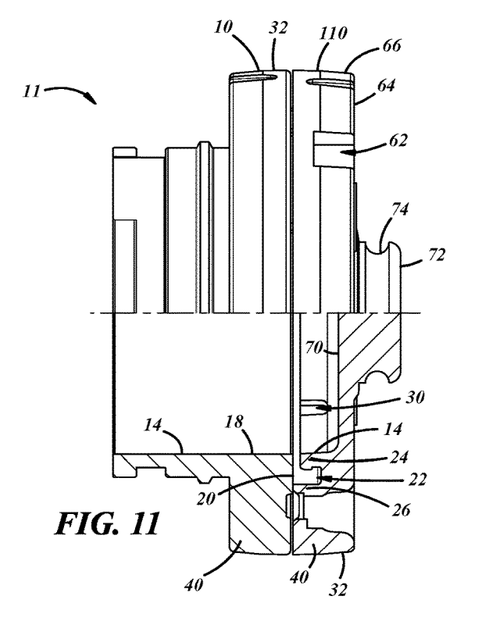
FIG. 11 is a fragmentary cross section view of the two coupled one-piece Storz-type fluid couplings along section B-B shown in FIG. 9, in accordance with an illustrative embodiment of the present disclosure.
Figure 12:
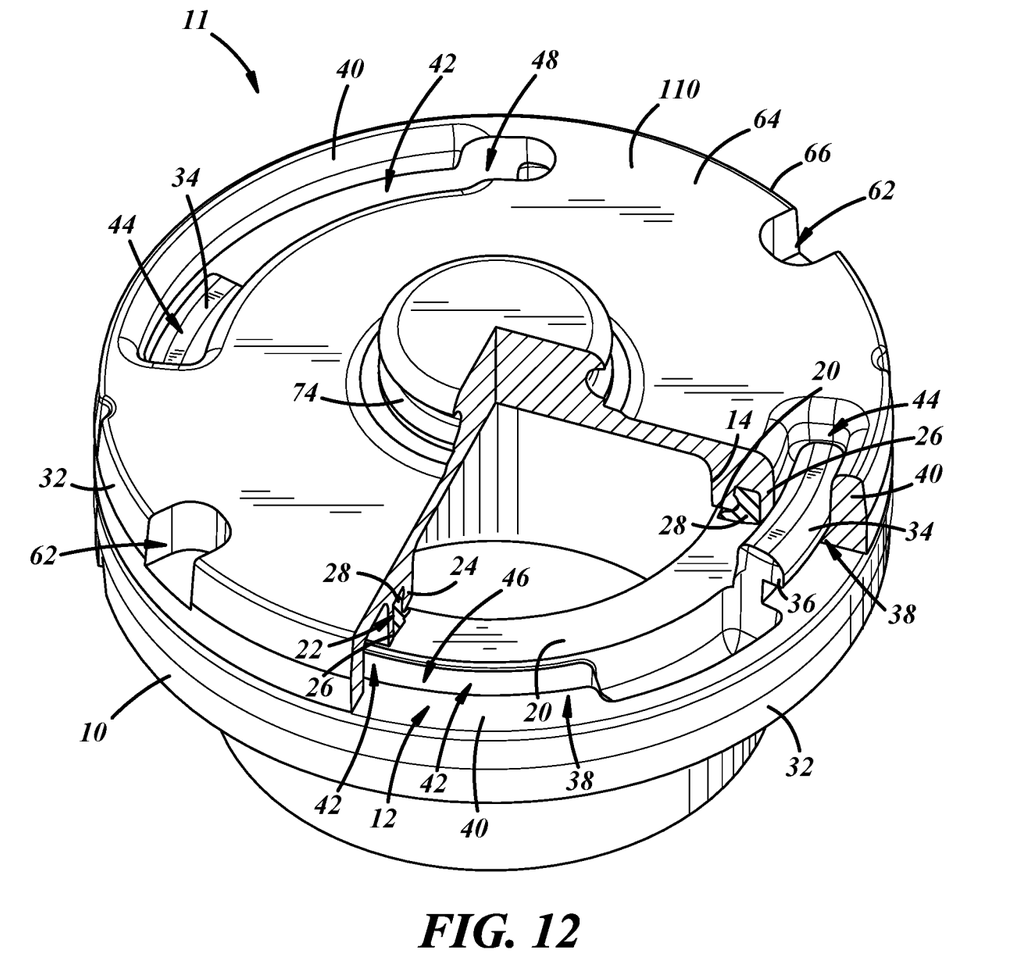
FIG. 12 is a fragmentary isometric cross section view of the two coupled one-piece Storz-type fluid couplings shown in FIG. 9, in accordance with an illustrative embodiment of the present disclosure.
Figure 13:
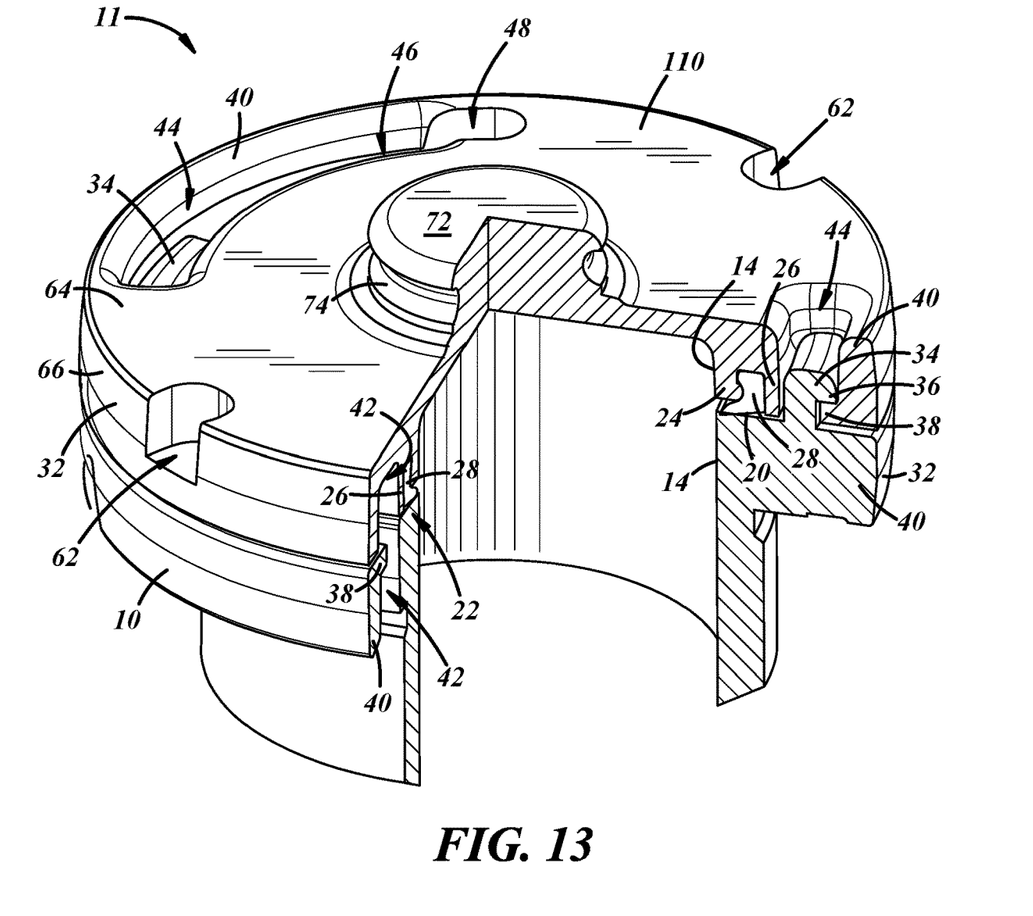
FIG. 13 is a fragmentary isometric cross section view of the two coupled one-piece Storz-type fluid couplings shown in FIG. 9, in accordance with an illustrative embodiment of the present disclosure.

FIG. 10 illustrates a cross-section view of section A-A of the fluid coupling 110 shown in FIG. 9. FIG. 11 illustrates a cross-section view of section B-B of the fluid coupling shown in FIG. 9. FIG. 12 illustrates a fragmentary isometric cross section view of the two coupled one-piece Storz-type fluid couplings 110 shown in FIG. 9, with a portion of the fluid coupling 110 serving as an external hub 72 shown removed. FIG. 13 illustrates a fragmentary isometric cross section view of the two coupled one-piece Storz-type fluid couplings 110 shown in FIG. 9, with a portion of both fluid couplings 110 shown removed.

Figure 14:
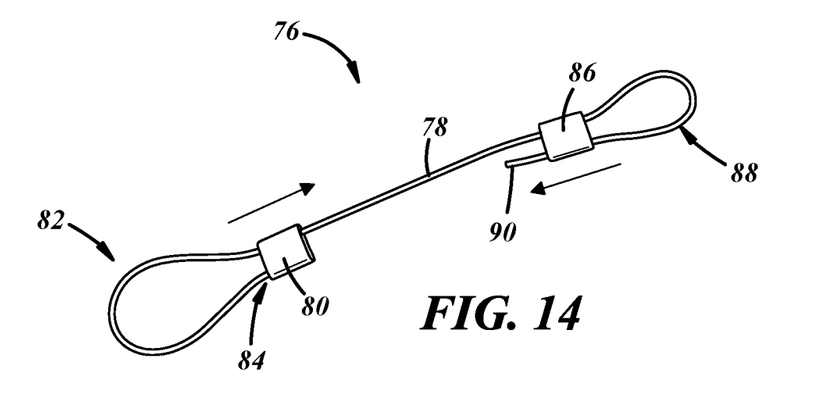
FIG. 14 is an isometric view of a cable seal coupling that can be used in a fluid coupling assembly, in accordance with an illustrative embodiment of the present disclosure.

In an embodiment, as shown in FIG. 14, the cable seal coupling 76 can include a cable 78 that passes through a first bolt seal termination 80 to make a first loop 82 having a first terminated end 84 and that passes through a second bolt seal termination 86 to make a second loop 88 having a second terminated end 90. A user can attach the cable seal coupling 76 to a fluid coupling 110 by inserting the first terminal end 84 through a hole in a monolithic body of the first bolt seal termination 80, placing the cable 78 around the external hub 72, and pressing it into a housing of the first bolt seal termination 80 to lock it in. When the cable 78 is pulled through the first bolt seal termination 80, the loop becomes smaller. The double-looped cable seal coupling 76 may be attached to the external hub 72 with the groove 74 by placing the first loop 82 over the external hub 72 and tightened by pulling the cable 78 through the first bolt seal termination 80. When the first loop 82 is coupled to the external hub 72 and tightened, the first loop 82 can fit and reside in the groove 74. In some instances, any bolt seal termination 80, 86 may be configured so that the cable 78 can be pulled only one way through the bolt seal termination 80, 86. The double-looped cable seal coupling 76 may be further attached to another fluid coupling 10 by attaching the second loop 88 to the other fluid coupling 10 in a similar manner. An advantage of using a double-looped cable seal coupling 76 can include no requirement of any special tools (e.g., a crimping tool) to couple the double-looped cable seal coupling 76 to each fluid coupling 10, 110.

Figure 15:
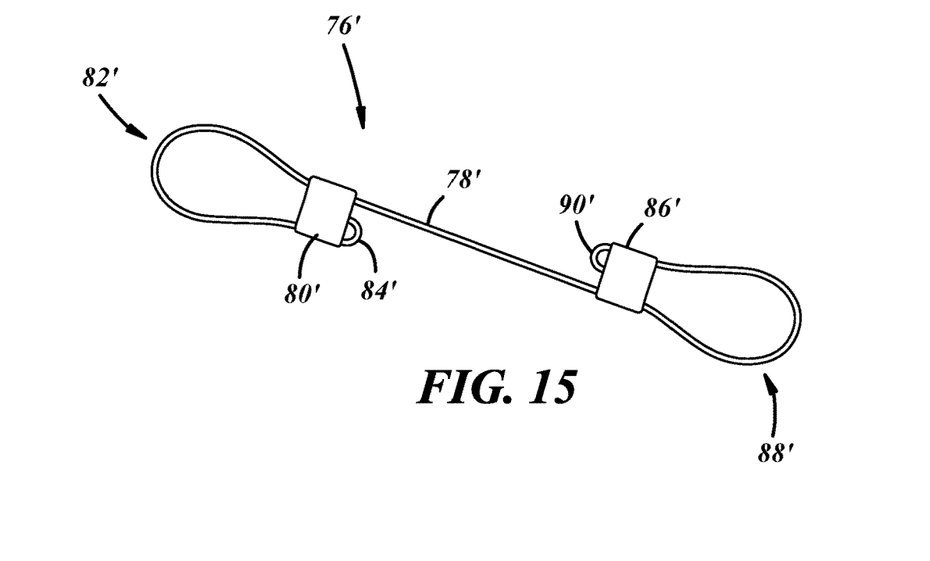
FIG. 15 is an isometric view of a cable seal coupling that can be used in a fluid coupling assembly, where the cable seal coupling can include at least one dual-locking bolt seal termination, in accordance with an illustrative embodiment of the present disclosure.

Referring to FIG. 15, a cable seal coupling 76' can include a cable 78' that passes through a first bolt seal termination 80' to form a first loop 82' with a first terminated end 84'. The cable 78' also passes through a second bolt seal termination 86' to form a second loop 88' having a second terminated end 90'. In this embodiment, the first bolt seal termination 80' and/or the second bolt seal termination 86' may include a dual-locking termination, where the cable 78' can pass a first time through the first bolt seal termination 80' and/or the second bolt seal termination 86' and can be locked or secured by the respective termination 80', 86'. Additionally, the first terminated end 84' and/or the second terminated end 90' can be inserted a second time into the respective termination 80', 86' to form a sealed cable seal coupling 76'.

Figure 16:
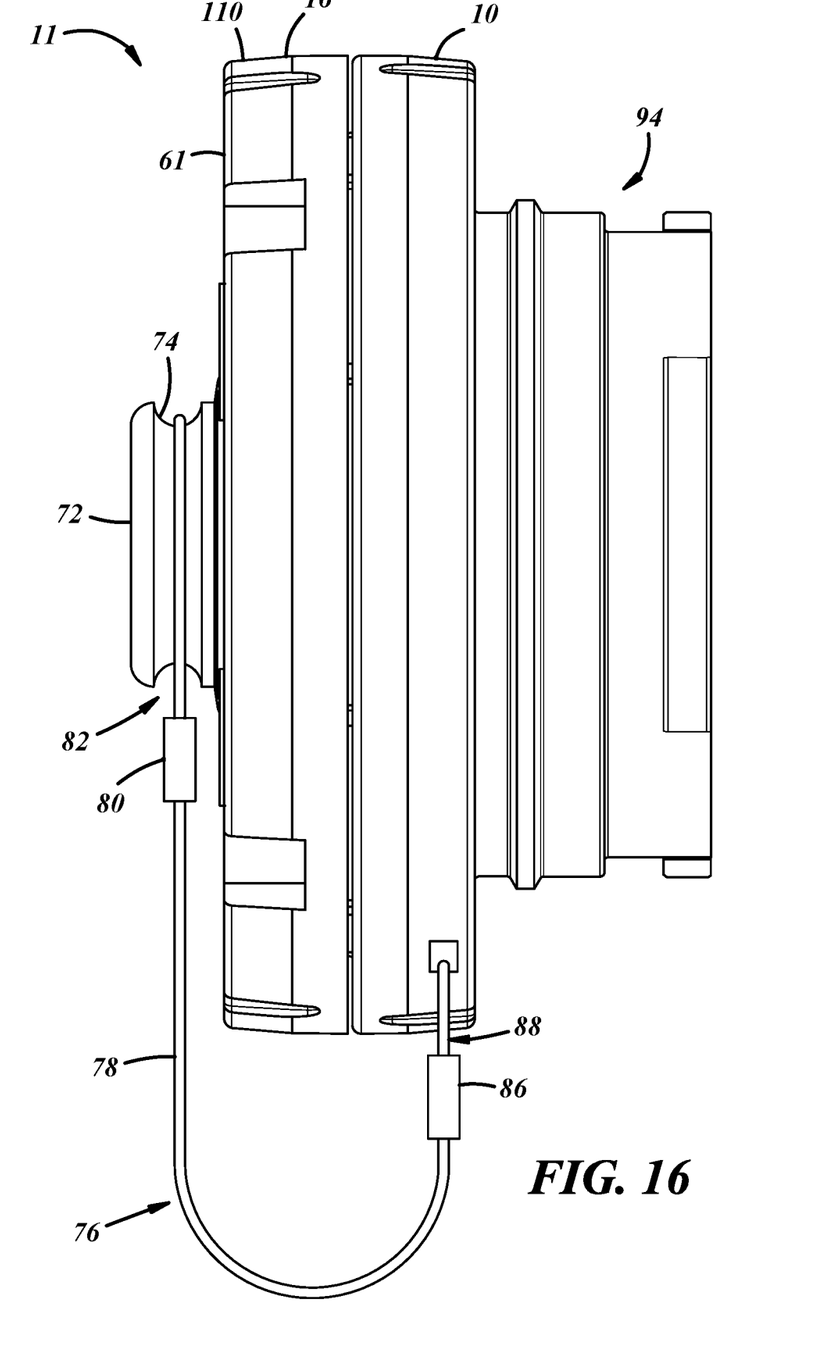
FIG. 16 is a side view of a fluid coupling system that includes multiple coupled fluid couplings and a cable seal coupling, in accordance with an illustrative embodiment of the present disclosure.

Referring to FIG. 16, a Storz-type fluid coupling assembly 11 can include multiple fluid couplings 10, 110 that are couplable to each other to create a watertight seal. In an example, a fluid coupling assembly 11 can include a first fluid coupling 110 that includes an inner cover wall 70 for serving as a blind cap. In this example, the fluid coupling assembly 11 can also include a second fluid coupling 10 that is couplable to the first fluid coupling 110, where the second fluid coupling 10 can be couplable to a hydrant. In another example, the first fluid coupling 10 can be couplable to a hose for carrying water, for example using a nozzle 94 and/or hose fitting, and the second fluid coupling 10 can be couplable to a hydrant.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expediency. The drawings are not necessarily shown to scale. The disclosure is intended to embrace all such modifications and variations as fall within the spirit and broad scope of the appended claims.

The invention claimed is:

1. A monolithic fluid coupling, comprising:
    a monolithic flange portion including
        an annular hub having an annular axially-facing sealing surface,
        coupling flanges extending circumferentially and spaced radially outwardly with respect to the annular hub and having lug retention lips and radially inwardly facing supporting walls,
        a pair of diametrically opposite lugs radially between the annular hub and the coupling flanges,
        lug entry/exit pockets circumferentially between the lugs and the lug retention lips,
        lug retention channels circumferentially between the lug entry/exit pockets and the lugs, and
        cleanout ports circumferentially between the lugs and the lug retention channels and including
            blind portions at least partially defined by circumferentially facing walls the lugs, the radially inwardly facing supporting walls of the coupling flanges, and a radially outwardly facing wall of the annular hub.

2. The monolithic fluid coupling set forth in claim 1, wherein the sealing surface of the annular hub includes a face seal groove establishing radially inner and outer hub walls, wherein the inner hub wall includes a plurality of vent notches therein.

3. The monolithic fluid coupling set forth in claim 1, wherein inner radii of the coupling flanges are constant between the lug retention lips and the radially inwardly facing supporting walls.

4. The monolithic fluid coupling set forth in claim 1, wherein the lug retention lips are ramped.

5. The monolithic fluid coupling set forth in claim 1, wherein the cleanout ports include:
  innermost radii coextensive with corresponding innermost radii of the lug retention channels, and
  outermost radii that are coextensive with corresponding outermost radii of the lug retention channels.

6. The monolithic fluid coupling set forth in claim 1, wherein the cleanout ports include through portions extending through the lug retention channels.

7. The monolithic fluid coupling set forth in claim 1, wherein the radially inwardly facing supporting walls of the blind portions extend to the lug retention lips and are radially coextensive therewith.

8. The monolithic fluid coupling set forth in claim 1, wherein the monolithic flange portion further includes diametrically opposed tool pockets intersecting external surfaces of the monolithic flange portion including a radially outer surface and an axially external surface.

9. The monolithic fluid coupling set forth in claim 1, further comprising an inner cover wall and being configured to be a blind cap.

10. The monolithic fluid coupling set forth in claim 1, configured to couple to a hydrant.

11. The monolithic fluid coupling set forth in claim 1, wherein the blind portions are also at least partially established by axially facing recessed surfaces between the annular hub and the coupling flanges, wherein the axially facing recessed surfaces have axial depths between $1/32$ and $5/32$ of an inch.

12. A fluid coupling system, comprising:
  a first one of the monolithic fluid coupling of claim 1 is configured to couple to a second one of the monolithic fluid coupling of claim 1; and
  a seal disposed between each sealing surface of each monolithic fluid coupling.

13. A fluid coupling assembly comprising:
  a monolithic fluid coupling, comprising:
    a flange portion including
      an annular hub having an annular axially-facing sealing surface,
      coupling flanges extending circumferentially and spaced radially outwardly with respect to the annular hub and having lug retention lips,
      a pair of diametrically opposite lugs radially between the annular hub and the coupling flanges,
      lug entry/exit pockets circumferentially between the lugs and the lug retention lips,
      lug retention channels circumferentially between the lug entry/exit pockets and the lugs,
      cleanout ports circumferentially between the lugs and the lug retention channels, and
      an inner cover wall having an external hub with a groove; and
    a double-looped cable seal coupling including a cable passing through a first bolt seal termination to make a first loop coupled to the external hub via the groove and passing through a second bolt seal termination to make a second loop configured to be coupled to another structure.

14. The assembly set forth in claim 11, wherein the double-looped cable seal coupling includes at least one dual-locking bolt seal termination.

15. A monolithic fluid coupling, comprising:
  a flange portion including
    an annular hub having an annular axially-facing sealing surface,
    coupling flanges extending circumferentially and spaced radially outwardly with respect to the annular hub and having lug retention lips and radially inwardly facing supporting walls,
    a pair of diametrically opposite lugs radially between the annular hub and the coupling flanges,
    lug entry/exit pockets circumferentially between the lugs and the lug retention lips,
    lug retention channels circumferentially between the lug entry/exit pockets and the lugs, and
    cleanout ports circumferentially between the lugs and the lug retention channels and including
      blind portions at least partially defined by circumferentially facing walls of the lugs, the radially inwardly facing supporting walls of the coupling flanges, and a radially outwardly facing wall of the annular hub,
      i) wherein the radially inwardly facing supporting walls of the blind portions extend to the lug retention lips and are radially coextensive therewith, or
      ii) wherein the cleanout ports include through portions extending through the lug retention channels, or
      iii) both i) and ii).

16. The monolithic fluid coupling set forth in claim 15, further comprising an inner cover wall and being configured to be a blind cap.

17. The monolithic fluid coupling set forth in claim 15, wherein the blind portions are also at least partially established by axially facing recessed surfaces between the annular hub and the coupling flanges, wherein the axially facing recessed surfaces have axial depths between $1/32$ and $5/32$ of an inch.

18. The monolithic fluid coupling set forth in claim 15, wherein the sealing surface of the annular hub includes a face seal groove establishing radially inner and outer hub walls, wherein the inner hub wall includes a plurality of vent notches therein.

\* \* \* \* \*